April 6, 1943.                G. R. DUNCAN                 2,315,603
                    COMBINATION REFRIGERATOR AND AERATOR
                 Original Filed April 7, 1938    4 Sheets-Sheet 1
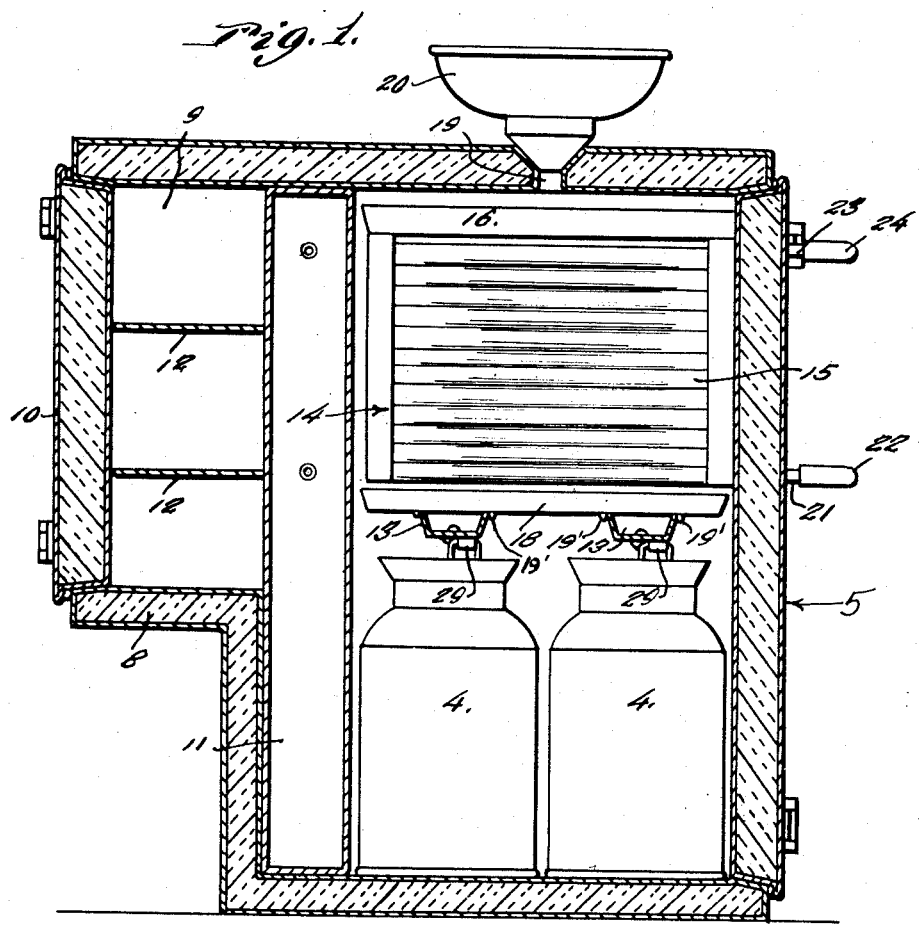
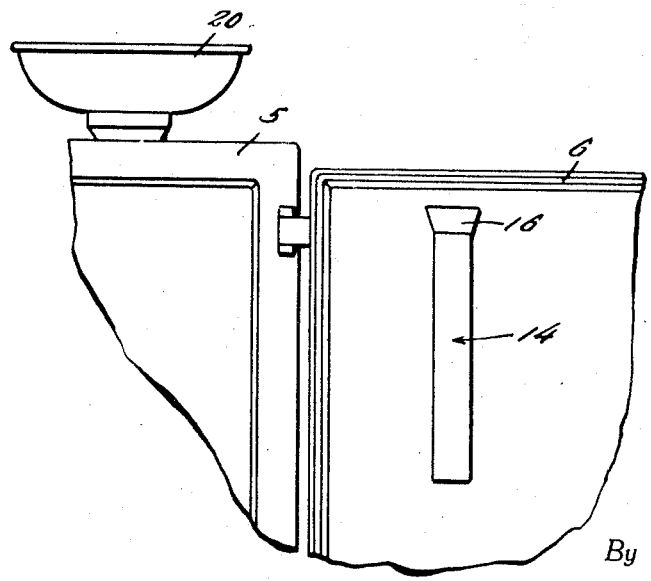
Inventor
G. R. Duncan
By Clarence A. O'Brien
and Hyman Berman
Attorneys April 6, 1943.  G. R. DUNCAN  2,315,603
COMBINATION REFRIGERATOR AND AERATOR
Original Filed April 7, 1938    4 Sheets-Sheet 2
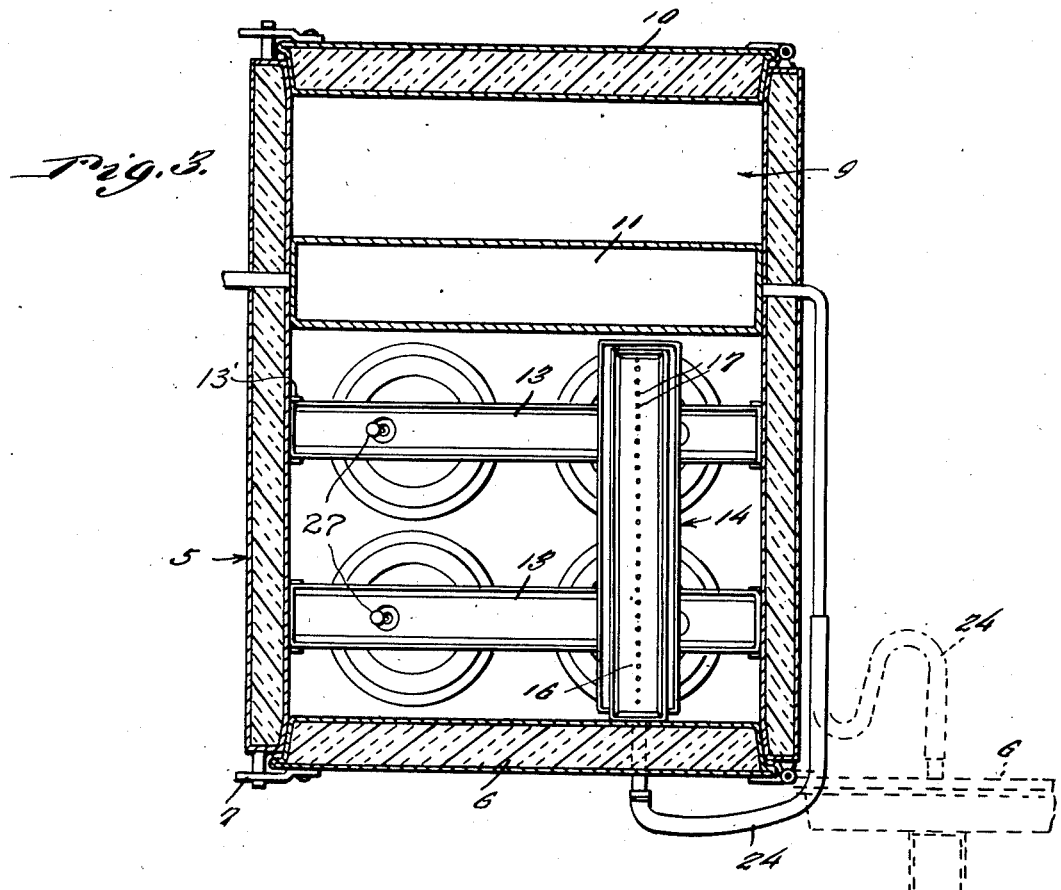
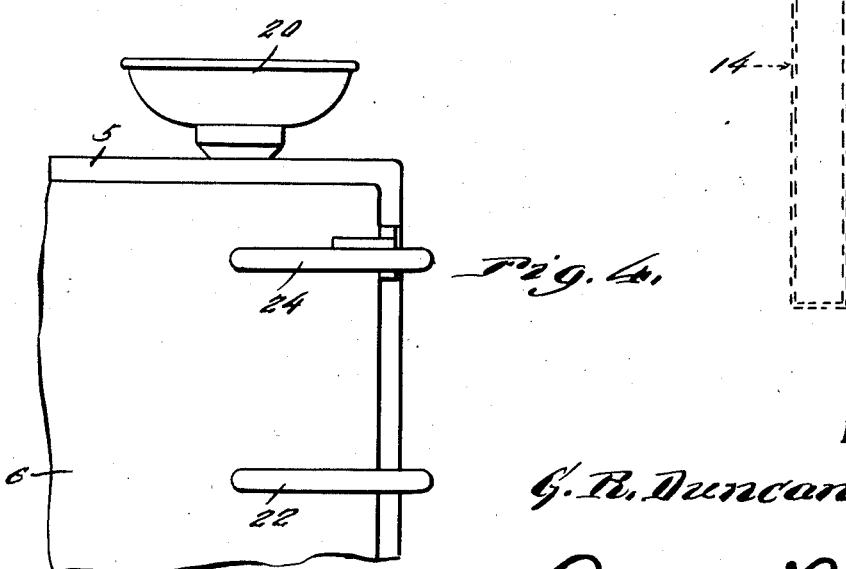
Inventor
G. R. Duncan
By Clarence A. O'Brien
and Hyman Berman
Attorneys

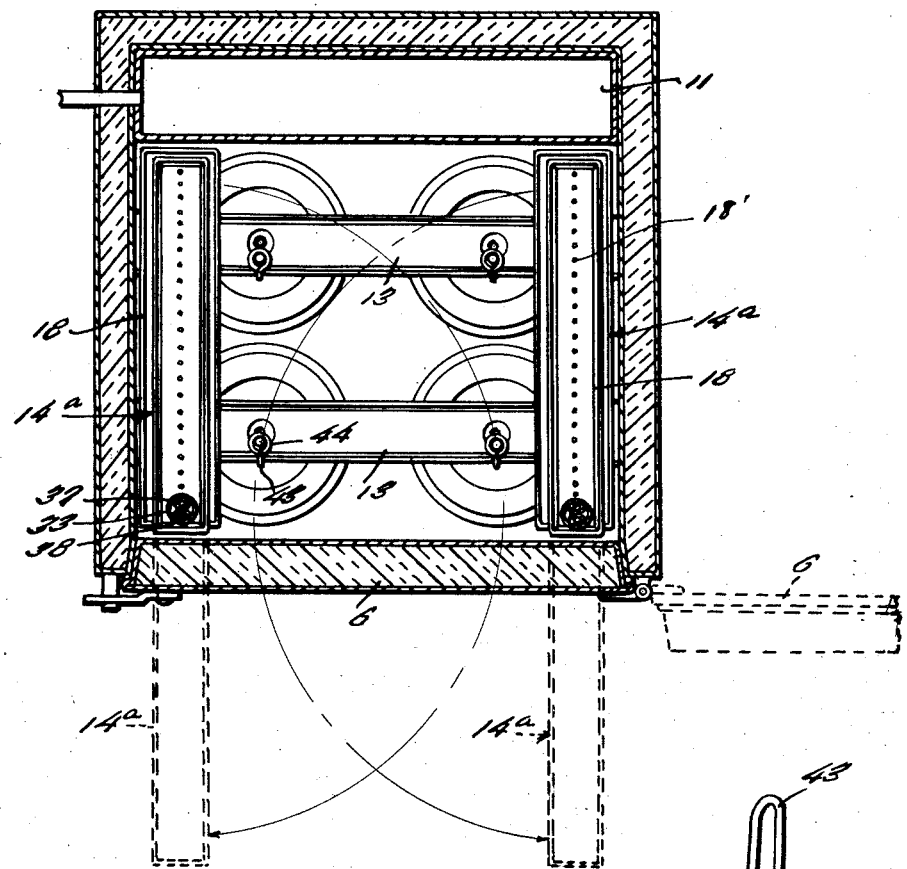
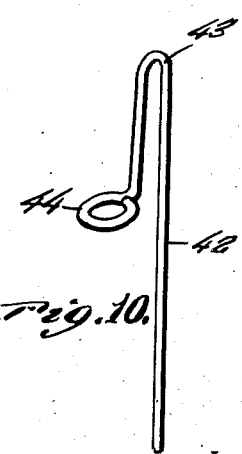
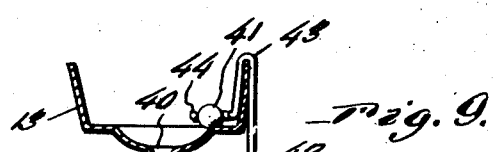
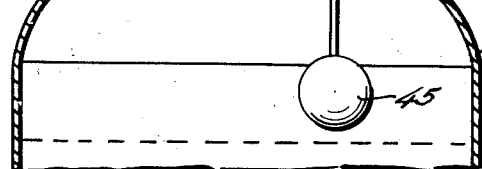

April 6, 1943.  G. R. DUNCAN  2,315,603
COMBINATION REFRIGERATOR AND AERATOR
Original Filed April 7, 1938  4 Sheets-Sheet 4
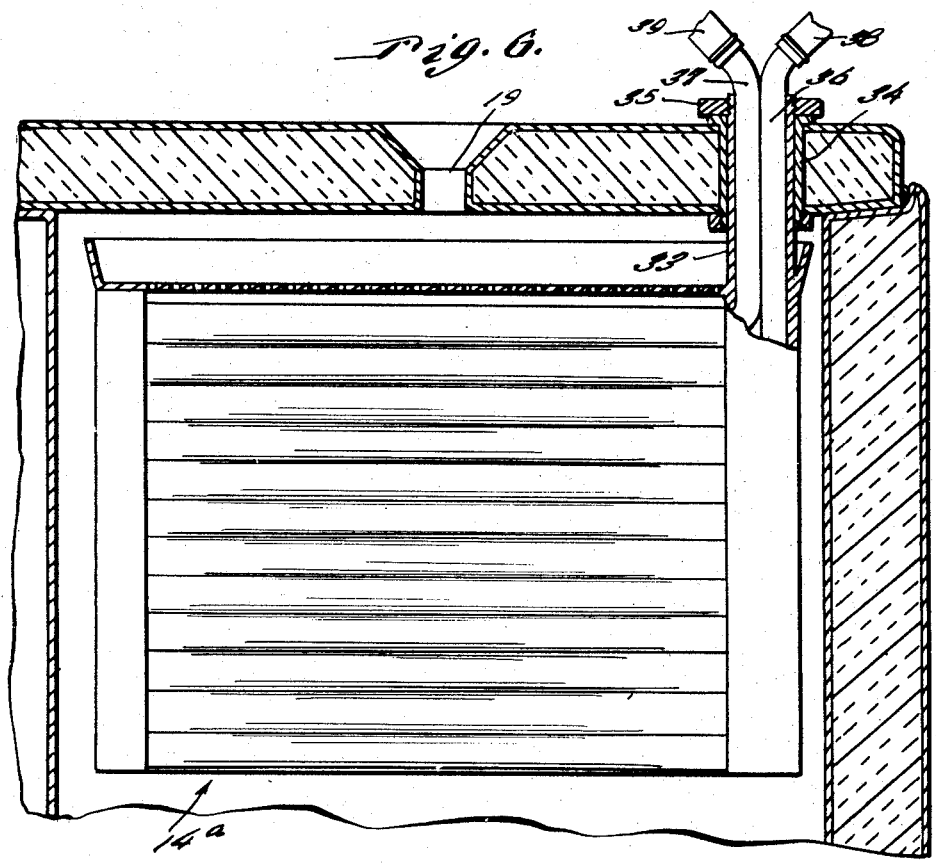
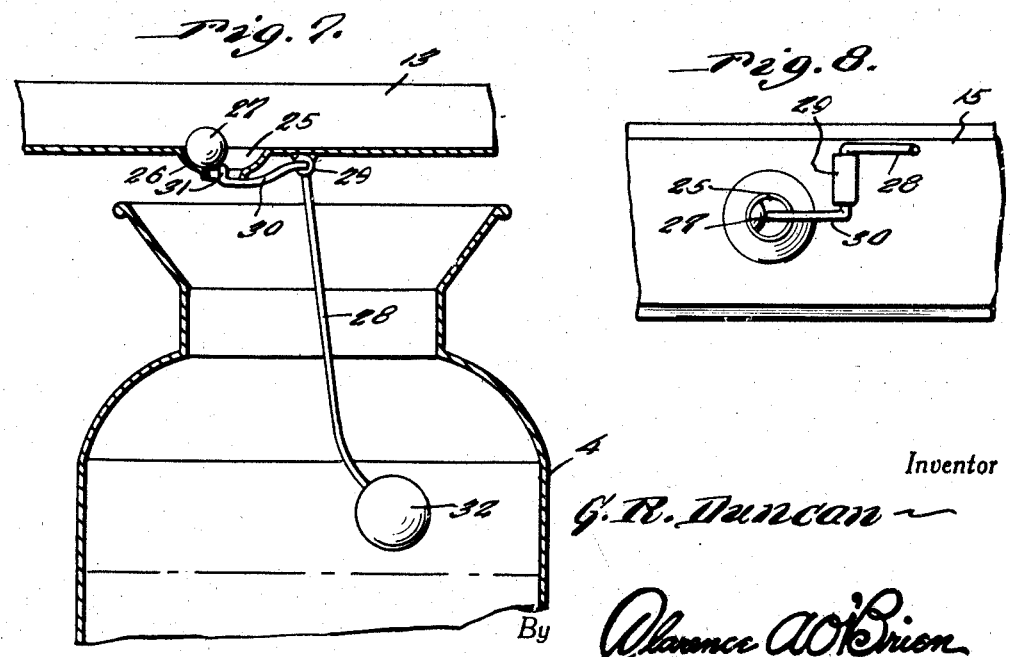
Inventor
G. R. Duncan
By Clarence A. O'Brien
and Hyman Berman
Attorneys Patented Apr. 6, 1943

2,315,603

UNITED STATES PATENT OFFICE 2,315,603

COMBINATION REFRIGERATOR AND AERATOR

George R. Duncan, Washington, Mo., assignor to Star Bucket Pump Company, St. Louis, Mo., a corporation of Missouri Refiled for abandoned application Serial No. 200,786, April 7, 1938. This application September 5, 1941, Serial No. 409,753

3 Claims. (Cl. 31—4)

This invention is a device for storing and aerating, that is filtering and cooling milk and/or cream.

In accordance with the present invention an insulated casing is provided with an auxiliary chamber or domestic compartment for use in storing such dairy products as butter, eggs, etc.

Further, an object of the invention is to provide an improved aerator assembly for disposition within the casing or cabinet.

A further object of the invention is to provide improved means for mounting the aerator whereby access may be had to the latter for easily cleaning the same.

The invention together with the above and numerous objects and advantages will be best understood from a study of the following description taken in connection with the accompanying drawings wherein:

Figure 1 is a vertical sectional view through one form of the invention,

Figure 2 is a fragmentary front elevational view with the main door of the casing or cabinet in open position, Figure 3 is a horizontal sectional view with the main door shown by full line in fully closed position and by dotted lines in open position, Figure 4 is a view similar to Figure 2 but showing the door in fully closed position.

Figure 5 is a view somewhat similar to Figure 3 but illustrating a slightly modified form of the invention, Figure 6 is a fragmentary detail vertical sectional view illustrating still another form of the invention, Figure 7 is a fragmentary detail view partly in section and partly in elevation showing one form of float-operated ball check valve, Figure 8 is a bottom plan view of the ball check valve assembly shown in Figure 7, Figure 9 is a view similar to Figure 7 and illustrating a second form of float control ball check valve assembly, and Figure 10 is a perspective view of a control rod forming part of the check valve assembly shown in Figure 9.

Referring more in detail to the drawings and particularly to the form of the invention shown in Figures 1 to 4 inclusive, it will be seen that in that form of the invention the device comprises a cabinet or casing 5 all the walls of which are insulated as shown in the drawings. Access to the interior of the casing is had at the front thereof through the medium of a hinged door 6 that is horizontally swingable and is provided with a suitable fastener 7.

At the back thereof the side and top walls of the casing are extended rearwardly while the back wall terminates short of the top wall and merges into a rearwardly extending wall extension 8 as shown in Figure 1 to provide with the aforementioned extensions of the side and top walls a domestic storage compartment 9 equipped with a horizontally swinging hinged door 10.

The rear wall of the compartment 9 is formed by the upper portion of a brine tank 11 positioned within the rear portion of the casing 5 as clearly shown in Figure 1. The brine in the tank 11 serves as a refrigerant medium for the casing 5 and its compartment 9.

Also the compartment 9, as shown, is preferably provided with shelves 12.

Suitably supported within the casing 5 and extending between the opposed side walls of the casing are, in the present instance, two distributor trays 13—13. The trays 13—13 are disposed at a suitable position above the bottom of the casing or cabinet to accommodate therebetween milk cans or similar containers 4, and the trays may be removably supported in brackets 13' or fixed thereto.

Fixedly mounted on the inner side of the door 6 is an aerator or cooling and filtering device indicated generally by the reference numeral 14. The device 14 is so mounted on the door as shown so as to extend transversely of the distributor trays 13 when the door 6 is in the closed position shown in Figure 3.

The aerator 14 which extends at right angles to the door 6 is shown in the present instance as consisting of a narrow rectangular shell or casing closed on all sides thereof and provided on opposite sides with horizontally corrugated vertical walls 15 over which the milk or cream flows downwardly to be cooled and aerated.

Suitably supported on the aerator and spaced from the top of the aerator is a receiving trough or tray 16 that in the bottom thereof is provided with a longitudinal series of perforations 17 through which the milk passes from the trough or tray 16 to flow downwardly over the surfaces or walls 15 of the aerator.

Also, arranged within the casing or cabinet 5 and disposed transversely of the distributor trays 13 adjacent one end of said trays is a receiving trough or tray 18. Tray 18 is provided on the bottom thereof adjacent its respective opposite ends with pairs of depending lugs 19' that accommodate therebetween the distributor troughs or trays 13 as shown in Figure 1. Also the trough or tray 18 is provided in the bottom thereof adjacent the ends of the trough or tray 18 discharge openings 18' through which the milk flowing into the tray 18 from the aerator 14 passes from the tray 18 into the troughs or trays 13.

From the trays or troughs 13 the milk passes into the receptacles 4 arranged with respect to the troughs or trays 13 in the manner clearly shown.

In the connection with the above it will be apparent that when the door 6 is swung to a closed position the aerator 14 will move into position directly over the trough or tray 18 and also to a position beneath an opening 19 provided in the top wall of the cabinet and suitably shaped to accommodate the discharge spout of a filtering funnel 20 as shown in Figure 1.

It will thus be seen that to aerate and cool the milk or cream as the case may be, the same is poured into the funnel 20 discharging from the funnel into the tray 16, passing from the tray 16 over both walls 15 of the aerator to be cooled and filtered by contact with the cold walls. From the walls 15 the milk or cream, as the case may be, flows into the tray 18 and from the tray 18 into the trays 13, to pass from the latter into the cans or receptacles 4.

In connection with the above it will also be understood that arranged within the shell or casing of the aerator 14 is a cooling coil provided for the circulation of brine, and this coil has an inlet end 21 connected through the medium of a conduit 22 with the outlet of the aforementioned brine tank 11, while the outlet 23 of the coil is connected by a flexible conduit 24 with an intake provided for the aforementioned brine tank 11.

In the form of the invention shown in Figures 1 to 4, inclusive, and Figures 7 and 8 each tray 13 is provided with a pair of discharge openings 25 and at said opening has the bottom thereof dished out to provide a substantially concave valve seat 26 which accommodates a ball valve 27.

A rod 28 is pivoted to the underside of the tray 13 as at 29 and is provided with an arm 30 that at its terminal has an upstanding projection 31 that works through the discharge opening in the tray to engage the ball 27 in a manner to normally hold the ball in a position so as not to interfere with the free flow of the contents of the tray 13 therefrom. On the free or opposite end of the rod 28 is a float 32.

It will thus be seen, reference being had to Figure 7, that the can or receptacle 4 is placed in a position with respect to the discharge opening 25 to receive the contents of the tray 13 flowing through said opening, and when so positioned the can receives the rod 28 and float 32 as shown. Obviously, normally the arm 28 is in the position shown in Figure 7, retaining the ball 27 in an out-of-the-way position. However, when the contents of the can 4 rise to contact the float 32 arm 28 is caused to swing in a counter-clockwise direction, thus moving the terminal 31 of arm 30 out of engagement with the ball 27, permitting the latter to seat and thereby close the opening 25 and prevent further discharge of the contents of the tray through said opening. Thus the danger of filling the can 4 beyond its capacity, and the running over of the milk are avoided.

In the forms of the invention shown in Figures 5 and 6 the aerator therein indicated by the reference numeral 14a instead of being fixedly mounted on the door at the inner side of the latter is hingedly mounted within the cabinet 5 so as to swing easily into and out of the cabinet. Thus as shown the aerator 14 is provided at one end thereof and at its upper corner with a tubular extension 33 that is journaled in a bushing 34 provided in the top wall of the casing adjacent the front side of the casing. Threaded on the upper end of the extension 33 is a retaining nut 35. Thus it will be seen that the aerator 14 is free to swing in a horizontal plane into and out of position with respect to the casing 5.

Also, as shown in Figure 6 the tubular extension 33 accommodates the inlet 36 for the brine or refrigerant circulating coil, and the outlet 37 for said coil, the inlet 36 and outlet 37 being connected respectively with the inlet and outlet respectively of the brine tank through the medium of flexible conduits 38, 39.

In Figure 5 I have illustrated how two pivotally mounted aerators 14a may be used, and where two are used obviously two trays 18 will be employed; and the top of the casing will have therein two openings 19, one for each of the aerators so that both aerators may be in use simultaneously if desired.

Also, in this form of the invention, and as clearly shown in Figure 9, each of the trays 13 is provided with a discharge opening 40 through which the contents of the tray passes into the can 4 and for each opening 40 there is provided a ball valve 41. However, in this form of the invention the control rod for the valve 41 is in the form of an elongated rod 42 that adjacent one end is bent back upon itself to form a hook 43 to engage over a side wall of the tray. The bill of the hook 43 merges into a lateral eye 44 that normally accommodates the ball valve 41 as shown in Figure 9. On the free end of the rod 42 is a float element 45. It will thus be seen that as the contents of the can 4 raises the float 45 and associated parts, eye 44 will move upwardly out of engagement with ball 41, permitting the latter to roll down to seat within the opening 40 and thereby cut off further flow of milk from the tray 13.

It is thought that a clear understanding of the construction, utility and advantages of an invention of this character will be had without a more detailed description.

Having thus described my invention, what I claim as new is:

1. In a device of the character described, a cabinet having insulated top, bottom, side and rear walls, and an insulated door for the front of the cabinet, said cabinet having the side and top walls thereof extended, and the rear wall thereof terminating short of the top wall and merging into a horizontal, rearwardly extending wall extension forming with the aforementioned wall extension at the back of the cabinet a domestic storage compartment, a hinged door for said storage compartment, a refrigerating device arranged within the cabinet at the back of the latter and including a casing the upper portion of which forms the rear wall for the domestic storage compartment, an aerator, means supporting the aerator for movement into and out of the cabinet, said aerator including a conduit for a refrigerant, and means operatively connecting said conduit with the aforementioned refrigerating device.

2. In a device of the class described, a cabinet adapted to have containers placed therein, an aerating device mounted for swinging movement into and out of said cabinet and adapted to assume a position above said containers when the latter are placed within the cabinet, trays mounted in the cabinet between said containers and the aerating device and having discharge openings located directly over said containers, a tray for receiving liquid from the aerating device and arranged transversely of the first-named trays and discharging liquid into the first-named trays, and means carried by the cabinet for discharging liquid onto said aerating device.

3. In a device of the character described, a cabinet adapted to have containers placed therein, a swinging door for opening and closing the cabinet, trays mounted in the cabinet over the containers when the latter are positioned in the cabinet and having discharge openings over said containers, a distributing tray overlying and supported by the first-mentioned trays, an aerating device mounted on said door for movement therewith and normally assuming a position over the distributing tray and including a receiving tray, and means on said cabinet for directing fluid into said receiving tray.

GEORGE R. DUNCAN.